United States Patent [19]

Griner et al.

[11] 4,035,998
[45] July 19, 1977

[54] TRACTOR MOUNTED TOBACCO COMBINE FOR DEFOLIATION AND SUBSEQUENT TRANSPORTATION OF TOBACCO LEAVES

[75] Inventors: Henry Griner; Wade Griner; Tommy Sweat; Claude Hyars, all of Patterson, Ga.

[73] Assignee: G S & H Equipment Corporation, Patterson, Ga.

[21] Appl. No.: 503,676

[22] Filed: Sept. 6, 1974

[51] Int. Cl.$^2$ .......................................... A01D 45/16
[52] U.S. Cl. ............................................... 56/27.5
[58] Field of Search .................... 56/27.5, 33, 34, 35

[56] References Cited

U.S. PATENT DOCUMENTS

| 2,657,514 | 11/1953 | Rust | 56/42 |
|---|---|---|---|
| 3,083,517 | 4/1963 | Wilson | 56/27.5 |
| 3,507,103 | 4/1970 | Pickett et al. | 56/27.5 |
| 3,601,959 | 8/1971 | Pinkham | 56/27.5 |
| 3,754,382 | 8/1973 | Rakestraw | 56/27.5 |

Primary Examiner—Russell R. Kinsey
Attorney, Agent, or Firm—Jim Zegeer

[57] ABSTRACT

There is disclosed a tobacco harvesting implement comprising a frame assembly for mounting on a tractor, the frame assembly carrying a defoliation assembly constituted by contra-rotating pairs of rectangular flapper elements having plural slots along the lateral edges thereof and kicker to the rear of the flapper means operated in association with the defoliation assembly for insuring the deposit of tobacco leaves on a pair of longitudinally running conveyors. The kicker elements are greater in length than the defoliating flapper elements and include at least a pair in line with the defoliating flapper elements and a pair of 90° relative thereto, and means are provided for adjusting the spacing between the pair of contra-rotating tobacco leaf defoliators.

8 Claims, 5 Drawing Figures

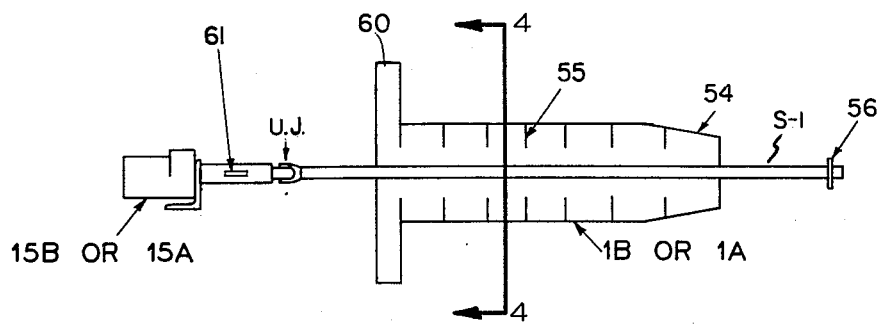
FIGURE 3
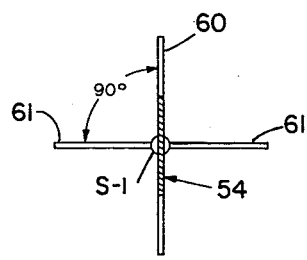
FIGURE 4
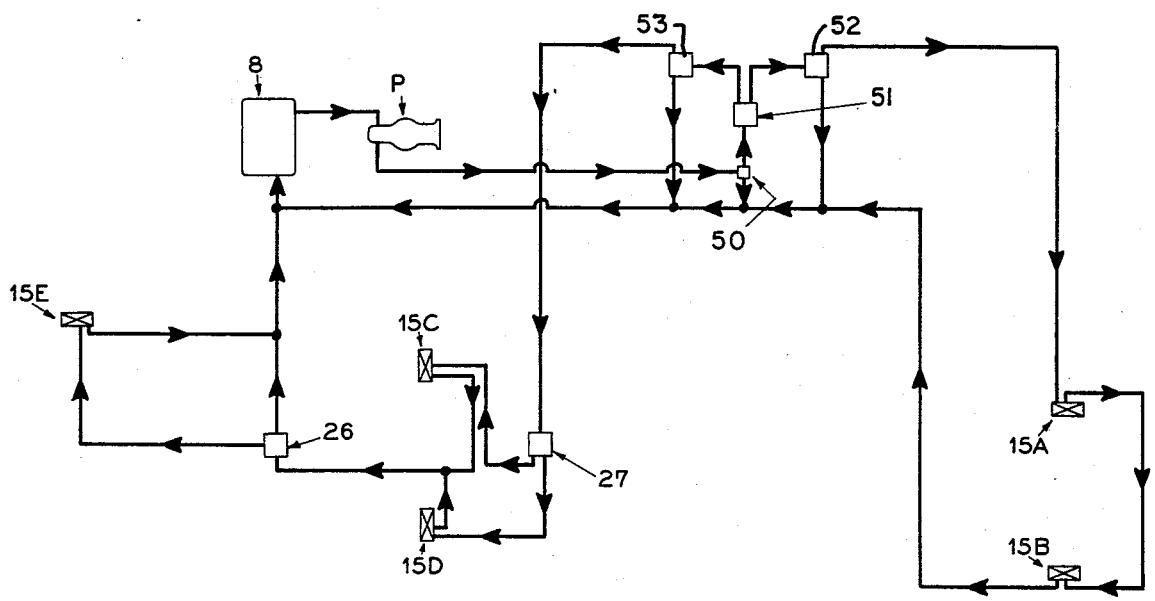
FIGURE 5   HYDRAULICS SCHEMATIC

TRACTOR MOUNTED TOBACCO COMBINE FOR DEFOLIATION AND SUBSEQUENT TRANSPORTATION OF TOBACCO LEAVES

This invention relates to a method and apparatus for harvesting tobacco leaves and, more particularly, it relates to a tobacco combine which can be mounted on an agricultural tractor with a rate of capacity of at least fifty horse power, the combine can be mounted and detached just like any other agricultural implement. Moreover, the tractor combine can be mounted on one or both sides of the tractor thereby giving the operator the capability of harvesting either one or two rows simultaneously. Improvements are provided in the defoliator assemblies per se which are constituted by flat, rectangularly shaped defoliators slotted on each side so as to produce a slapping effect and thereby defoliating the tobacco leaves. Each of the defoliators is equiped at its rear with means for insuring the deposit of tobacco leaves onto the conveyor assemblies, such means being constituted by kickers. In addition, upper and lower stalk guide assemblies are provided for assuring the proper positioning of the stalks of tobacco with respect to the defoliator assemblies. Furthermore, the defoliators are mounted on contrarotating shafts which may be adjusted for widening or narrowing the gap between the two defoliators.

BRIEF DESCRIPTION OF THE DRAWINGS

The above and other objects, advantages and features of the invention will become more apparent from the following specification taken in conjunction with the accompanying drawings wherein:

FIG. 3 is a side elevational view of a defoliator assembly as incorporated in the invention, FIG. 4 is a cross sectional view taken on lines 4—4 of FIG. 3, and FIG. 5 is a schematic diagram of the hydraulic drive system for supplying drive power to the different implements in accordance with the invention.

DETAILED DESCRIPTION OF THE INVENTION

Figure 1:
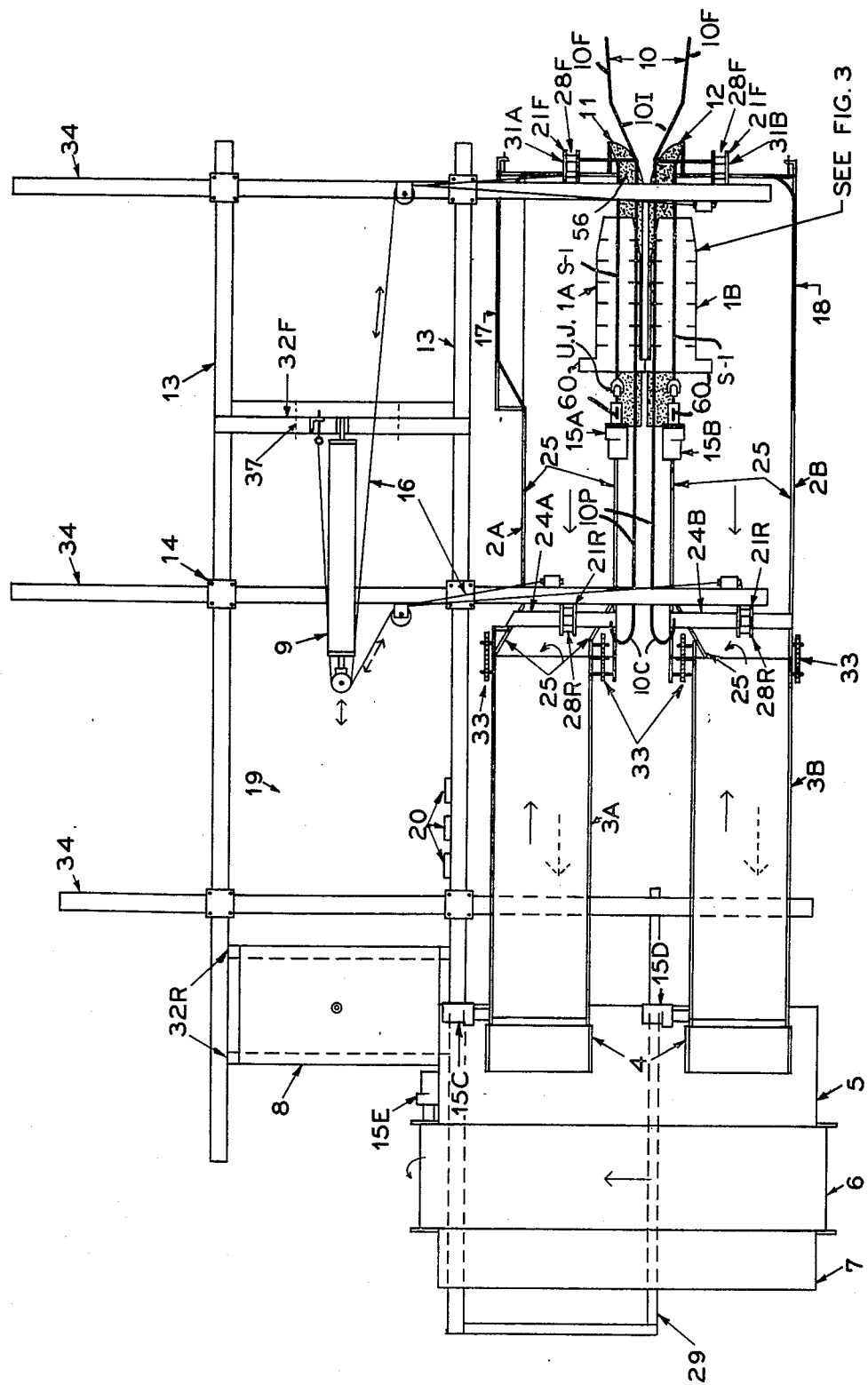
FIG. 1 is a top plan view of a tractor combine incorporating the invention.

The tractor combine is a three point attachment unit. It is mounted by bolts to any tractor in three different locations. In front the tractor combine is attached to the weight mount of the agricultural tractor 37; in the rear, it is attached at two locations, to the rear axle housing 35 of the tractor and inside each wheel (not shown). There are four main vertical hollow iron beams 22F, 22R, which support the tractor combine. In the back they are mounted on the plates 36 which attach to the axle housing. The attachement in the front is by way of a horizontal lateral hollow iron beam (not shown), which is bolted to the tractor's weight mount 37. This horizontal lateral beam supports the two main vertical beams 22F. These four vertical beams 22F, 22R support two longitudinal main beams 13, which are located directly above and in line with the tractor and they function as the main support structure for the tractor combine. The four vertical main beams 22F, 22R are provided with lateral stability and rigidity through four upper horizontal and transversely disposed beams 32F, 32R, which run between the two longitudinal main beams. Two of these horizontal transverse beams are located in the front above the weight mount attachment and two are located in the rear behind the driver's seat (not shown) of the tractor, on which the hydraulic fluid reservoir 8 rests. They function in a dual capacity. The longitudinal main beams 13, the four vertical beams 22F, 22R, and the four horizontal lateral beams 32F, 32R connecting them, provide the structural integrity for the entire assembly. In addition thereto are two braces 23 located in the front, running at a 45 degree angle between the front portion of the front vertical main beam to the lower portion of the longitudinal main beams 13 to insure further integrity and stability. All attachments except those that attach to the tractor itself consist of welds.

Lying immediately on top of the two horizontal longitudinal main beams 13 are located three heavy duty transversely extending beams 34, which project laterally at 90° angle from the intended direction of movement of the tractor, from which the tractor combine is actually suspended. The three transverse beams are fastened to the longitudinal system by U bolts and plates 14.

From these transversely extending beams 34 are suspended four vertical suspension guide beams, two in front 21F and two in rear 21R, which provide a rigid guidance system.

As shown in FIG. 1 the defoliation unit 1A, 1B and the conveyor assemblies 2A, 2B are affixed to the vertical guide beams by two front roller guides 28F and two rear roller guides 28R. These units are suspended by four cables 16 which, through a system of pulleys, located on the lateral extending beams 34, are activated by hydraulic cylinder 9.

Figure 2:
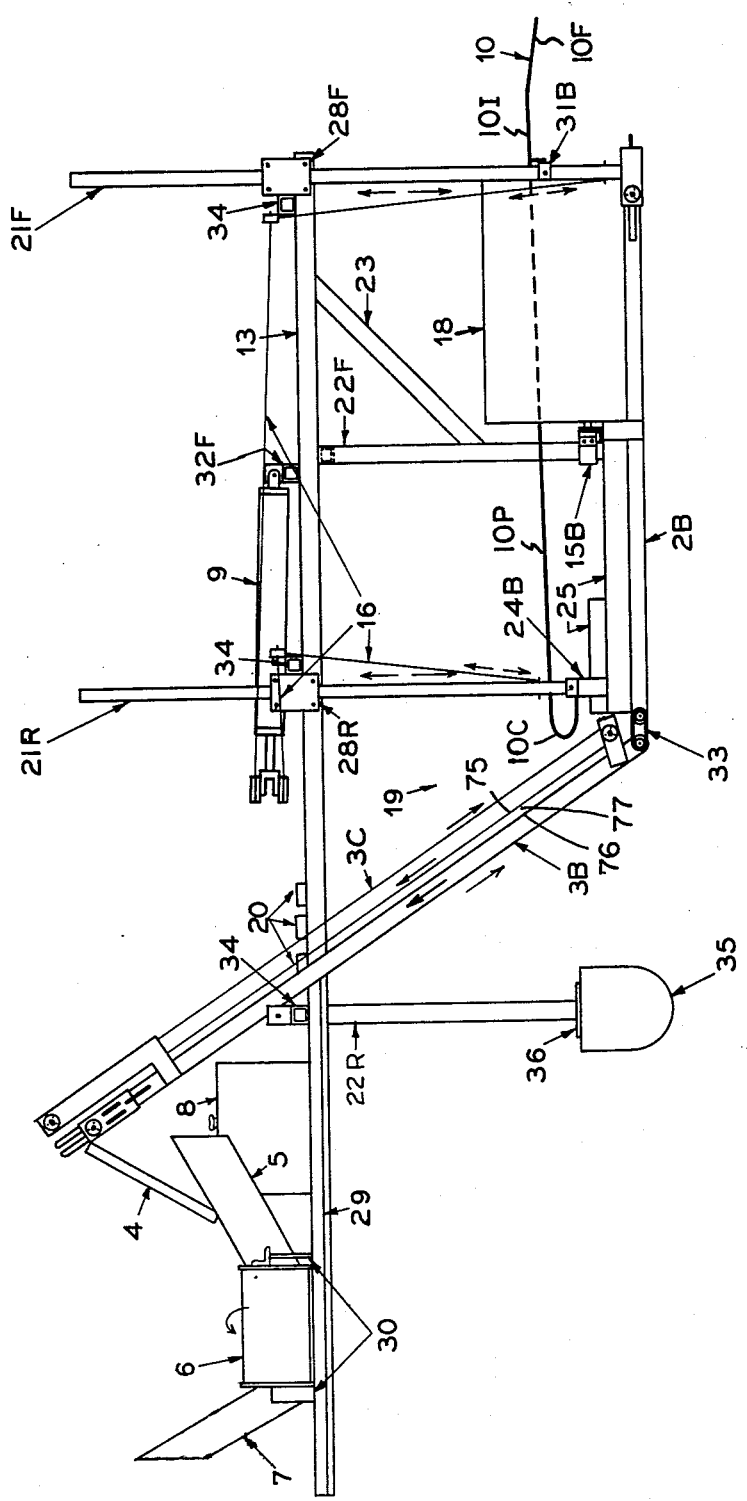
FIG. 2 is a side elevational view of a tractor combine incorporating the invention.

The conveyor assemblies 2A, 2B are suspended by suspension brackets in the rear 24A, 24B (the rear drawn only) and directly attached in the front to the conveyor belt assembly. The hereinabove described cables 16, actually attach to the suspension brackets and front suspension guides 21F, which gives vertical control to the entire tractor combine. As shown in FIGS. 1 and 2, the front vertical suspension guide beams 21F are slideably mounted in the front suspension guides 28F and the rear vertical suspension guide beams 21R are slideably mounted in rear suspension guides 28R. The whole unit can thus be lowered to the ground or raised, at the option of the operator. Hydraulic motors 15C, 15D activate oblique conveyor assemblies 3A, 3B which, through the gears and endless chains 33, activate all other conveyor assemblies 2A, 2B, 3C. The conveyor assemblies are interconnected by a system of activation gears and endless chains 33.

THE DEFOLIATION ASSEMBLY

The defoliation system consists of upper stalk guides 10 which, as shown in FIGS. 1 and 2, project forwardly of the tractor combine and are constituted by bars. The diverged forward ends 10F converge toward one another (see FIG. 1) and project downwardly (see FIG. 2). The upper guides include intermediate portions 10I which converge to gradually rearwardly sloping parallel portions 10P which are connected by curved portions 10C to rear suspension brackets 24A, 24B by welding. A pair of lower stalk guides 11, 12 are positioned below the defoliator elements 1A and 1B. As shown in FIG. 1, the lower stalk guides 11 and 12 and the upper stalk guides 10 define a path through which tobacco stalks are guided as the tractor traverses a given row of tobacco plants. The actual defoliation is accomplished by two counter-rotating flat rectangular pieces of composition material which are outfitted with slots. The composition material defining the slots does the actual defoliating of the tobacco stalk.

As shown in FIG. 3, each defoliator element 1A and 1B is a flat flapper element 54 having slits or slots 55 2 inches deep and 7 per side, the forward end of each having tapered ends. They are attached by two metal shafts 51 and 52, the front of each being journaled into a ball bearing device at end 56, and the back of which fastens to a universal joint U.J. The defoliator shafts are rotated in opposite directions by hydraulic motors 15A and 15B which are supplied in series with hydraulic fluid from a pump (see FIG. 5). The forward ends of the shafts S1 and S2 are laterally adjustable by adjustment 31A and 31B, the universal joints U.J. permitting this adjustment so that the spacing between the defoliators can be widened or narrowed. Located at the rear of the rectangular flappers are kickers 60 and 61 (located to the rear of universal joint U.J.) which are radially longer than the flappers 54, there being a pair of kickers in line with the flappers and a pair at an angle of 90° (see FIG. 4), which propel the defoliated tobacco leaves onto the horizontal conveyor belts 25. Then the tobacco leaves are prevented from falling off the conveyor belts by shields and fenders 17, 18, 25 which are carried at the outer sides of conveyor assemblies 2A and 2B. The leaves are then transported toward the rear by conveyors 25, where they are deposited onto the oblique conveyor belt assemblies 3B and 3C. Conveyors 3B and 3C are located on top of one another with facing runs 75 and 76 driven in the same direction with a narrow space 77 for tobacco leaves between facing runs, which insures the upward transportation of the tobacco leaves and prevents them from sliding downward. The tobacco leaves are deposited from the top of the oblique conveyor belt assemblies 3B and 3C onto the lateral-conveyor tray 5 from whence they slide onto the lateral-conveyor assembly 6 which is driven by hydraulic motor 15C supplied from the pump (see FIG. 5). Located at the rear of the lateral-conveyor assembly is located a shield 7 which prevents spillage. The lateral-conveyor assembly 6 transports the tobacco leaves onto a tray (not shown) which is located at the rear of the tractor, which is placed on any lifting device which is suitable for tractor attachments. Here the tobacco leaves can be stored or racked by a laborer.

As shown in FIG. 5 the defoliation and conveyor assemblies are driven by a separate hydraulic pump 70 which is activated by the P.T.O. unit of the tractor and supplied by a hydraulic fluid reservoir 8 (see FIG. 4). Hydraulic fluid from pump P flows through a pressure relief valve 50 to a 50—50 flow divider 51. Two parallel paths are provided from divider 50: a first path including further flow control divider 52 which controls flow of hydraulic fluid to defoliator drive motors 15A and 15B, and a second path including flow control divider 53 which controls flow of hydraulic fluid to the conveyor drive motors 15C, 15D and 15E, there being a 50—50 flow divider 27 to provide equal hydraulic fluid flow to conveyor motors 15C and 15D, the flow from these two motors being combined and supplied to control valve 26 which controls flow of hydraulic fluid to conveyor motor 15E. The flow from the two paths returns to oil sump tank 8. The vertical control system is driven by the tractor hydraulic system, which is inherent in all U.S. made tractors, which the inventors are acquainted with.

We claim:

1. A tobacco harvesting implement comprising
   a first frame assembly means for mounting same at a fixed level on a tractor,
   a second frame assembly mounted for vertical movement on said first frame assembly,
   a defoliation assembly mounted on said second frame assembly, said defoliation assembly being elongated in the direction of travel and including a pair of counter rotating tobacco leaf defoliators, upper and lower stalk guide means for guiding tobacco leaf-bearing stalks between said pair of counter rotating tobacco leaf defoliators, the upper stalk guide being above said counter rotating tobacco leaf defoliators and the lower stalk guide being below said counter rotating tobacco leaf defoliators,
   conveyor means on said frame assemblies, said conveyor means being positioned below said defoliation assembly for receiving defoliated tobacco leaves and conveying same parallel to said direction of travel, and
   kicker means for engaging defoliated tobacco leaves and operated in association with said defoliation assembly for insuring the deposit of defoliated tobacco leaves on said conveyor means.

2. The invention in claim 1 including means for vertically adjusting the position of said defoliation assembly relative to said first frame assembly to thereby adjust the height of said defoliation assembly relative to ground and said tobacco leaf bearing stalks.

3. The invention in claim 1 wherein each said defoliator includes a plurality of rectangular flapper elements, each flap of a flapper element having axially extending edge portions with a plurality of axially spaced slits which extend inwardly from said edge portions, respectively.

4. The invention in claim 3 wherein said means operated in association with said defoliators is constituted by a plurality of kicker elements, greater in length than said flapper elements and to the rear thereof so that all tobacco leaves are given a greater centrifugal force outwardly from said defoliator assembly, and
   said conveyor means including a pair of parallel conveyor runs adjacent said defoliator and being adapted to convey defoliated tobacco leaves.

5. The invention in claim 1 including means for adjusting the spacing between said pair of counter rotating tobacco leaf defoliators.

6. The invention in claim 1 wherein said conveyor means includes a pair of conveyor runs, one at each respective side of said defoliator assembly, a first oblique conveyor belt receiving tobacco leaves from said pair of conveyor belt means, and including a further oblique conveyor belt spaced above said first oblique conveyor belt to insure proper upward transportation of said tobacco leaves.

7. The invention defined in claim 6 including a work space for tobacco leaf racking, and a lateral conveyor assembly positioned to receive tobacco leaves from said oblique conveyor run and deliver same to such work space.

8. A tobacco harvesting implement comprising
   a first frame assembly having means for mounting same at a selected fixed level on a tractor and at least a pair of beams which have portions extending in a direction lateral of said means for mounting, a second frame assembly mounted for vertical movement on said laterally extended portions of said pair of beams, said first frame assembly including a plurality of roller guide means secured to said laterally extended portions of said pair of beams and a like number of vertical beams each respectively guided in one of said roller guides, a defoliation assembly secured to the lower ends of said vertical beams of said second frame assembly, said defoliation assembly being elongated in the direction of travel and including means for guiding tobacco leaf-bearing stalks between a pair of counter rotating tobacco leaf defoliators, conveyor means on said frame assemblies, said conveyor means including a first portion positioned immediately contiguous to and below said defoliation assembly for receiving defoliated tobacco leaves and conveying same in a direction opposite said direction of travel, and a second portion for receiving tobacco leaves from said first portion and conveying same upwardly and rearwardly of said defoliator assembly, means operated in association with said defoliation assembly for insuring the deposit of tobacco leaves on said conveyor means, a height adjusting motor on said first frame and means connecting each said vertical beam to said motor for adjusting the height of said second frame and defoliation assembly relative to ground.

* * * * *